Figure 1:
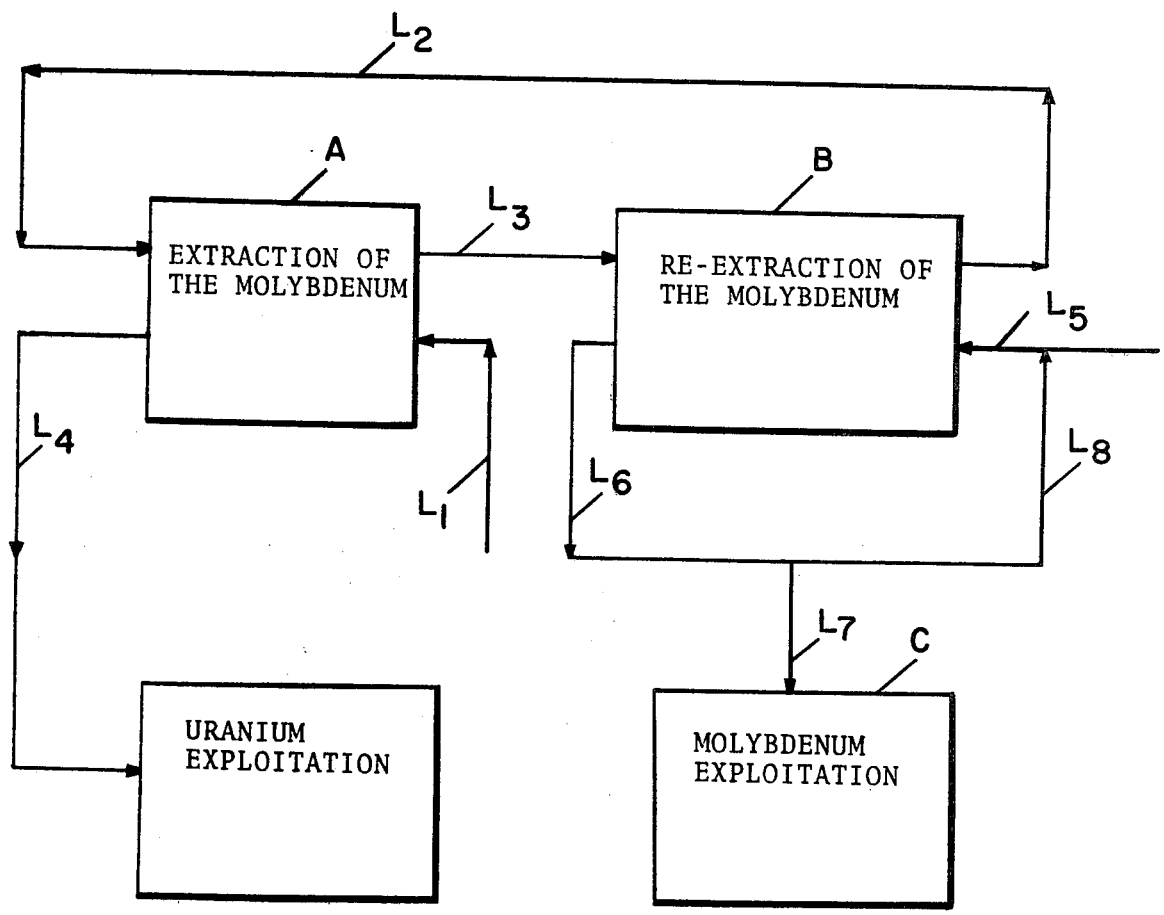

United States Patent [19]

Floreancig et al.

[11] 4,363,788
[45] Dec. 14, 1982

[54] SEPARATION OF URANIUM AND MOLYBDENUM USING A SOLVENT

[75] Inventors: Antoine Floreancig, St. Genis Laval; Jean-Pierre Cuer, Francheville, both of France

[73] Assignee: Uranium Pechiney Ugine Kuhlmann, Paris, France

[21] Appl. No.: 130,127

[22] Filed: Mar. 13, 1980

[30] Foreign Application Priority Data

Mar. 19, 1979 [FR] France ................ 79 07467

[51] Int. Cl.³ .................. B01D 11/02; C01G 39/00; C01G 43/00; C01G 56/00
[52] U.S. Cl. .......................... 423/9; 423/10; 423/54
[58] Field of Search ................ 423/9, 10, 54

[56] References Cited

U.S. PATENT DOCUMENTS

| | | | |
|---|---|---|---|
| 2,877,250 | 3/1959 | Brown et al. | 423/9 |
| 3,052,513 | 9/1962 | Crouse | 423/9 |
| 3,083,076 | 3/1963 | Drobnick et al. | 423/9 |
| 3,156,524 | 11/1964 | Drobnick et al. | 423/9 |
| 3,223,476 | 12/1965 | Hart | 423/9 |
| 3,241,909 | 3/1966 | Henrickson | 423/9 |
| 3,450,639 | 6/1969 | Maria et al. | 423/54 |
| 3,933,971 | 1/1976 | Baucom | 423/54 |
| 4,188,361 | 2/1980 | Rowden | 423/9 |

OTHER PUBLICATIONS

Merritt, "The Extractive Metallurgy of Uranium", Col. Shool of Mines Research Intitute, 1971.

Primary Examiner—Allan Lieberman
Attorney, Agent, or Firm—McDougall, Hersh & Scott

[57] ABSTRACT

A process for separating by means of an organic agent the uranium and the molybdenum contained in an aqueous liquor originating from a sulphuric attack of an urano-molybdeniferous ore which involves placing the said attacking liquor in contact with an organic extraction solution containing at least one tertiary or secondary amine in an (amine)/(Mo) molar ratio of up to 0.8, separating the molybdenum-charged organic phase from the uranium-rich aqueous phase, treating the organic phase with an aqueous liquor containing at least one mineral agent in the form of alkaline and ammonium hydroxide and/or carbonates to form an aqueous solution which is concentrated in molybdate.

17 Claims, 1 Drawing Figure

SEPARATION OF URANIUM AND MOLYBDENUM USING A SOLVENT

The invention relates to a process for the selective extraction, using an organic solvent, of molybdenum from an aqueous liquor originating from the acidic attack of a uraniferous ore having a relatively high molybdenum content in the form of impurities. It also relates to a process for recovering the molybdenum present in the aqueous liquors in order to utilize it.

For a long time, the skilled man has encountered major problems, when it appears necessary to separate the uranium, which is a sought-after element, from other metallic elements, such as molybdenum, vanadium, etc., present in the attacking liquors.

The technical literature has previously proposed numerous processes for separating uranium and the impurities accompanying it.

A first type of well known process, described in an article by E. T. Hollis and H. E. Dixon of the U.S. Atomic Energy Commission, Report W.I.N. 53 dated July 29, 1958 or again in the Netherland Application No. 65/11 360 (Cl B Old) dated Mar. 1, 1966 in the name of American Metal Climax Inc., based on United States Application filed Aug. 31, 1964, involved passing the uraniferous liquor originating from the attack of the ore over a solid fixing element, such as activated carbon or an anion type resin.

The passage of the uraniferous liquor over a solid fixing element of this type allowed the molybdenum impurity to be absorbed while the uraniferous element remained substantially in solution.

Users found these processes to be of interest but they had disadvantages such as, for example, the obtaining of a molybdenum eluent in such low concentration as to make it difficult to exploit.

Another type of process, which is well known to the skilled in the art, involves extracting the uranium and the molybdenum simultaneously from the aqueous liquor originating from the acidic attack of a uraniferous ore, using organic solvents, such as amino solvents, which are usually known for extracting all the uranium from the said liquors, then separating these two elements during the liberation of the uranium contained in the organic phase, for example by placing this organic solvent, which is charged with uranium and molybdenum, in contact with an aqueous solution of alkaline or ammonium chlorides to re-extract the uranium in the form of a uranyl salt, while the molybdenum remains in the organic solvent.

One of the major disadvantages of such a process lies in the fact that, to extract all the uranium, the quantity of organic solvents has to be markedly increased, especially when the molybdenum content becomes too large.

Another disadvantage also lies in the fact that scum appears at the moment of liberation of the uranium at the interface between the aqueous and organic phases when the initial molybdenum content is large and, in numerous cases, this adversely affects the operation of industrial installations for uranium recovery with, for example, a lower quantitative yield of uranium or again a reduction in the capacity of the apparatus used, necessitating frequent interruptions for cleaning purposes. A separation process of this type has been described in "The Extractive Metallurgy of Uranium" by Robert Merritt, pages 196–201.

The processes pertaining to the prior art and involving the use of an organic extractant such as the amines, for example, has been applied to the treatment of aqueous liquors originating from the attack of uraniferous ores having low molybdenum contents.

It is an object of this invention to provide a process for exploiting uraniferous ores having a higher molybdenum content than those treated in the prior art and more particularly, it is an object of this invention to provide a new process for separating uranium and molybdenum which, in contrast to the prior art, extracts the molybdenum but not the uranium from the liquor attacking the uraniferous ores, leaving the uranium in solution in the liquor originating from the attack.

The new process for separating the uranium and the molybdenum contained in an aqueous liquor originating from the sulphuric attack of a urano-molybdeniferous ore using an organic amino agent is characterized by the fact that the aqueous liquor originating from the sulphuric attack is placed in contact with at least one tertiary and/or secondary amine in organic solution in a molar ratio (amine)/(Mo) of less than or at most equal to 0.8, in that the molybdenum-charged organic phase obtained is then separated from the aqueous phase which is impoverished in molybdenum and rich in uranium, in that the molybdenum-charged organic phase is placed in contact with an aqueous solution containing at least one mineral agent from the group comprising the alkaline and ammonium hydroxides and/or carbonates to form an aqueous solution concentrated in molybdate, and in that the said aqueous solution which is rich in molybdate is separated from the regenerated amino organic solution.

As previously described, the process according to the invention is geared to the extraction of the molybdenum dissolved in the liquors attacking the uranomolybdeniferous ores and not the uranium.

The extraction agent is preferably a tertiary amine but can also be a secondary amine, both of which are insoluble in an aqueous medium.

Suitable tertiary amines include amines in which each alkyl is $C_7$ to $C_{13}$, such as, trinormaloctylamine, triisooctylamine, trilaurylamine, tridecylamine, etc.

The secondary $C_7$–$C_{13}$ alkyl amines can also be used as molybdenum extraction agent, such as dioctylamine, didecylamine, dilaurylamine.

These amino extraction agents can be used alone or in a mixture in an impure form of the type present in commercial preparations, or in commercial preparations containing a mixture of several amines.

The quantity of amino extraction agent placed in contact with the liquor charged with uranium and molybdenum is defined by the molar ratio of the amine and molybdenum constituents contained in the attacking liquor and the organic solution, the applicants having found that the (amine)/(Mo) molar ratio should be at most 0.8. When the (amine)/(Mo) molar ratio is close to this value, some uranium is extracted from the liquor with the molybdenum. When this ratio is adjusted to any value below this threshold of 0.8, the quantity of uranium extracted at the same time as the molybdenum decreases with a decrease in this ratio.

However, to extract sufficient molybdenum, it is undesirable to make use of too low a ratio. This is why the applicants have devised a range of variation for this ratio which can depend on the presence of certain impurities contained in the attacking liquors, such as phosphate ions, silicates, vanadates. This range is comprised between 0.8 and 0.1 and preferably between 0.55 and 0.15.

When the attacking liquor contains phosphate ions, their presence increases the extraction capacity of the amino agent and thus allows a reduction in the quantity of amino agent to be used. In certain particular cases, it may be desirable deliberately to add some phosphate ions to the liquor to be treated if it does not initially contain such ions.

Generally speaking, the amino extraction agent is not introduced alone into the medium to be treated but instead it is preferably dissolved beforehand in an organic diluent in order to reduce its viscosity and to facilitate its use. Commonly used diluents include aliphatic hydrocarbons, aromatic hydrocarbons such as paraffins, naphthas, benzene, toluene, xylene, dodecane and chlorinated organic solvents such as carbon tetrachloride.

Moreover, a third substance is desirably, though not necessarily, introduced into the mixture of amine and diluent to help to dissolve the amine salts formed during the extraction of the molybdenum. Suitable such third substances include long-chained $C_8$ to $C_{14}$ alcohols such as, for example, octanol, tridecanol or alcohols obtained by oxo-synthesis, or trialkyl phosphates such as tributyl-phosphate.

The quantities of amino extraction agent and of third substance introduced into the diluent depend somewhat on the compositions of the liquors to be treated originating from the attack of uranomolybdeniferous ores.

These quantities are expressed in grams per liter of a molybdenum extraction solution composed of the mixture of amino extraction agent, the third substance and the diluent. The quantity of amino extraction agent is in the range of from 5 g/l to 400 g/l but preferably from 10 g/l to 200 g/l while the quantity of the third substance introduced is generally within the range of from 10 g/l to 300 g/l.

The extraction treatment is generally carried out at a temperature between 20° C. and 50° C., but it can be carried out at temperatures outside this range.

Once the molybdenum has been extracted from the liquor originating from the attack of the ore, a molybdenum-charged organic solution is obtained. The said molybdenum is then re-extracted using an aqueous solution of a mineral agent of basic character in order to regenerate the organic extraction solution for recycle and to recover the molybdenum-containing aqueous solution.

To effect this re-extraction, it is possible to use a mineral agent having an alkaline tendency and belonging, for example, to the group comprising the alkaline or ammonium hydroxides or to the group comprising the alkaline or ammonium carbonates in the form of an aqueous solution which is placed in contact with the molybdenum-charged organic solution.

The molybdenum then passes into an aqueous solution in the form of molybdenate which can be utilized in a known manner while the amino extraction solvent can be reused.

The aqueous solution containing the molybdenum can itself be used in part for this re-extraction after it has been recharged with alkaline elements.

The molybdenum can be extracted by means of the organic amino solution by merely placing the aqueous liquor to be treated in contact with the said amino solution. It is desirable to carry out this operation in a continuous manner in accordance with the technique well known to the skilled in the art by counter-current extraction in order to increase the uranium and molybdenum separation factor.

The uranium remains in solution in the aqueous liquor which is impoverished in molybdenum and can be recovered by one of the methods known to the skilled in the art such as, for example, the extraction of the uranium using amines, this amine possibly being the same as the one used for extracting the molybdenum.

The apparatus used in the process according to the invention can be formed of a series of mixer-decanters, or by extraction columns.

The invention will be understood better by reference to the diagram representing the process of the invention which illustrates continuous and counter-current extraction of the molybdenum contained in a liquor originating from the attack of a uranomolybdeniferous ore.

According to the figure, the liquor $L_1$ originating from the attack of the uranomolybdeniferous ore is introduced into a battery A of the mixer-decanter type while the organic amino solution $L_2$ is simultaneously introduced into the said battery in counter-current flow.

An organic solution $L_3$, charged with molybdenum having a very low uranium content, as well as an aqueous liquor $L_4$ which is impoverished in molybdenum and contains almost all the initial uranium is obtained from the outlets of the battery (A). This liquor $L_4$ is then conveyed into a uranium-exploiting circuit (not described).

The molybdenum-charged organic solution $L_3$ is then conveyed into a battery (B) comprising one or more mixer-decanters where the molybdenum is re-extracted by means of an aqueous solution $L_5$ of a mineral agent of basic character such as, for example, a mixed solution of ammonia and ammonium carbonate introduced into the battery (B). Furthermore, this solution $L_5$ allows the regeneration of the amino extraction solution $L_2$ which is recycled into the battery (A).

A concentrated aqueous liquor $L_6$ of molybdate is collected at the outlet of the battery (B) and one part is introduced via $L_7$ into zone (C) where the molybdenum is exploited by a method known to the skilled in the art while the other part is recycled into battery (B) via $L_8$ which is connected to the liquor $L_5$.

EXAMPLE 1

The three tests given below were carried out discontinuously in order to prove the influence of the (amine)/(Mo) molar ratio when, in accordance with the practice of this invention, it is below 0.8.

| | |
|---|---|
| Test a - | 1 liter of a uraniferous liquor $L_1$ containing molybdenum per 0.04 liters of the organic amino solution $L_2$. |
| Test b - | 1 liter of this same uraniferous liquor $L_1$ per 0.02 liters of the organic amino solution $L_2$. |
| Test c - | by way of control, 1 liter of this same uraniferous liquor $L_1$ per 0.25 liters of the organic amino solution $L_2$, this volume normally being used in processes for the total extraction of uranium in the presence of molybdenum according to the prior art. |

The synthetic liquor $L_1$, representing a typical liquor obtained during the attack of a uranomolybdeniferous ore, contained 1 g/l of uranium, 1 g/l of molybdenum and 10 g/l of sulphuric acid.

The organic amino extraction solution $L_2$ contained:

52 g/l of trilaurylamine introduced in the form of a commercial preparation
30 g/l of tridecyl alcohol and a hydrocarbon having a high aromatic content: SOLVESSO 150.

Once these two liquors had been placed in contact and had been stirred for 30 minutes, the phases were separated by decanting to give the organic phase $L_3$ and the aqueous phase $L_4$.

The following table I classifies the (amine)/(Mo) molar ratios corresponding to the volume of solutions $L_1$ and $L_2$ indicated above as well as the uranium and molybdenum contents of the organic solution $L_3$ obtained after decanting the above two phases.

This table shows that, according to the invention, it is possible to recover a fraction of the molybdenum selectively (tests a and b), that this selectivity is increased by reducing the (amine)/(Mo) molar ratio and that there is virtually no selectivity for molar values which are too high such as 2.5 in the control test c.

TABLE I

| (amine)/(Mo) molar ratio presented by means of $L_1$ and $L_2$ | Composition of $L_3$ in g/l (organic liquor leaving extraction) | |
|---|---|---|
| | Uranium | Molybdenum |
| Test (a) : 0.4 | 0.010 | 19.5 |
| Test (b) : 0.2 | <0.005 | 19.8 |
| Control Test (c) : 2.5 | 3.6 | 3.88 |

EXAMPLE 2

This example demonstrates the influence of the $PO_4^=$ ions when present in the liquor $L_1$ to be treated.

The three tests defined below were carried out discontinuously for this purpose:

| | |
|---|---|
| Test d - | 1 liter of a synthetic uraniferous liquor $L_1$ containing 1 g/l of uranium, 1 g/l of molybdenum 3.6 g/l of $PO_4^=$ and 10 g/l of sulphuric acid are treated with 0.04 liters of the organic amino solution. |
| Test e - | 1 liter of this same synthetic liquor $L_1$ is treated with 0.02 g/l of the organic amino solution $L_2$. |
| Test f - | as a control test, 1 liter of this same synthetic liquor $L_1$ is treated with 0.25 liters of the organic amino solution $L_2$, this volume normally being used in processes for the total extraction of the uranium in the prior art in the presence of molybdenum. The organic amino extraction solution $L_2$ is qualitatively and quantitatively the same as in example 1. |

The same operations of placing the phases obtained in contact and decanting them are carried out, as indicated in example 1 and the results obtained are indicated in table II.

TABLE II

| (amine)/Mo) molar ratio presented by means of the liquors $L_1$ and $L_2$ | Composition in g/l of the organic liquor $L_3$ leaving extraction | |
|---|---|---|
| | Uranium | Molybdenum |
| Test (d) : 0.4 | 0.100 | 21.8 |
| Test (e) : 0.2 | 0.007 | 29.8 |
| Control Test (f) : 2.5 | 3.6 | 3.9 |

This table shows that the presence of the $PO_4^=$ ions increases the ability of the amine to extract far more molybdenum.

EXAMPLE 3

The molybdenum contained in the sulphuric liquor originating from the attack of a uranomolybdeniferous ore was extracted continuously and in counter-current flow in a battery of seven laboratory mixer decanters.

The liquor $L_1$ originating from the attack of the ore contained 1 g/l of molybdenum and 1 g/l of uranium as well as 11 g/l of sulphuric acid.

The organic extraction solution $L_2$ contained:
41 g/l of trinormaloctylamine (in a commercial form)
50 g/l of tridecyl alcohol originating from oxo-synthesis,
a mixture of hydrocarbons having a high aromatic content (SOLVESSO 150).

The (amine)/(Mo) molar ratio was 0.5.

According to the flow diagram shown, 1 liter per hour of the liquor $L_1$ was treated continuously and in counter-current flow with 0.05 liters per hour of the solution $L_2$ in the battery (A).

0.05 liters of the solution $L_3$, containing 19.8 g/l of molybdenum and only 0.005 g/l of uranium, and about 1 liter of the liquor $L_4$, containing only 0.010 g/l of molybdenum and about 1 g/l of uranium, representing more than 99.9% of the uranium present in the liquor $L_1$, was obtained at the outlet of the battery (A).

The molybdenum-charged solution $L_3$ was then treated in the mixer-decanter (B) with 0.005 liters per hour of an aqueous solution $L_5$ containing 100 g/l of $NH_3$, thus producing a solution $L_6$ of ammonium molybdate containing 200 g/l of molybdenum and a regenerated organic solution $L_2$ which was recycled into the extraction battery (A).

EXAMPLE 4

100 liters per hour of an aqueous liquor $L_1$, originating from the attack of a uranomolybdeniferous ore, were treated with 4.3 liters per hour of an organic solution $L_2$ in a molybdenum extraction battery (A) comprising 4 mixer-decanters.

The liquor $L_1$ was composed of:

| | |
|---|---|
| uranium | 0.72 g/l |
| molybdenum | 0.95 g/l |
| $PO_4^=$ | 1.60 g/l |
| $H_2SO_4$ | 20.00 g/l |

The solution $L_2$ was composed of:

| | |
|---|---|
| trilaurylamine | 52.00 g/l |
| tridecyl alcohol | 30.00 g/l |
| SOLVESSO 150 diluent-sufficient quantity | |

The (amine)/(Mo) molar ratio was 0.43.

A solution $L_3$, containing 21.6 g/l of molybdenum and 0.012 g/l of uranium, as well as a solution $L_4$, containing 0.72 g/l of uranium and less than 0.050 g/l of molybdenum, was recovered at the outlet of (A).

The solution $L_4$ thus contained more than 99.9% of the uranium initially present in $L_1$ and could be exploited by extraction by means of an amino solvent based on trinormaloctylamine.

The organic solution $L_3$ was treated in a counter-current process in the battery (B) comprising two mixer decanters with 0.64 liters per hour of a mixed solution $L_5$, containing 70 g/l of $NH_3$ and 4 g/l of $(NH_4)_2CO_3$, producing a solution $L_6$ of ammonium molybdate, containing 140 g/l of molybdenum and less than 0.1 g/l of uranium.

With a view towards exploiting the molybdenum, the solution $L_6$ was heated in order to decompose the $(NH_4)_2CO_3$ and to precipitate an ammonium uranate which can be recycled into $L_4$ or $L_1$.

We claim:

1. A process for separating uranium and molybdenum contained in an aqueous liquor originating from the sulphuric acid treatment of uranomolybdeniferous ore characterizing contacting said aqueous liquor with at least one amine which is insoluble in an aqueous medium, selected from the group consisting of the tertiary and secondary amines dissolved in an aliphatic or aromatic hydrocarbon or a chlorinated hydrocarbon diluent, to obtain an organic phase and a aqueous phase separating the molybdenum-charged organic phase from the aqueous phase which is improverished in molybdenum and rich in uranium, contacting the molybdenum-charged organic phase with an aqueous solution containing at least one mineral agent selected from the group consisting of alkaline and ammonium hydroxides, carbonates and mixtures thereof to form an aqueous solution which is rich in molybdate from the regenerated organic amino solution wherein the amine/Mo molar ratio is in the range from about 0.1 to about 0.8.

2. A separation process according to claim 1, in which the (amine)/(Mo) molar ratio is between 0.55 and 0.15.

3. A separation process according to claim 1, in which each alkyl group in the amine is $C_7$ to $C_{13}$.

4. A separation process according to claim 3, in which the amine is a tertiary amine selected from the group consisting of trinormaloctylamine, triisooctylamine, tridecylamine and trilaurylamine.

5. A separation process according to claim 3, in which the amine is a secondary amine selected from the group consisting of dioctylamine, didecylamine and dilaurylamine.

6. A separation process according to claim 3, in which the amine is dissolved beforehand in an organic diluent selected from the group consisting of aliphatic or aromatic hydrocarbons and chlorinated organic solvents.

7. A separation process according to claim 6, in which the organic diluent is selected from the group consisting of paraffins, naphthas, benzene, toluene, xylene, dodecane and carbon tetrachloride.

8. A separation process according to claim 1, in which a long-chained $C_8$ to $C_{14}$ alcohol obtained by oxo-synthesis is added as a third substance to the diluent.

9. A separation according to claim 8, in which the long-chained alcohol is selected from the group consisting of octanol, and tridecanol.

10. A separation process according to claim 1, in which the organic amine separation solution contains between 5 g/l and 400 g/l of amine.

11. A separation process according to claim 1, in which the organic amine separation solution contains between 10 g/l and 200 g/l of amine.

12. A separation process according to claim 8, in which the organic amine separation solution contains between 10 g/l and 300 g/l of third substance.

13. A separation process according to claim 1, in which some $PO_4^=$ ions are added to the aqueous liquor originating from the sulphuric attack of the uranomolybdeniferous ore.

14. A process according to claim 1, in which the molybdate-rich aqueous solution is recycled for the re-extraction of the molybdenum.

15. A process according to claim 1, in which the uranium contained in the molybdenum-impoverished aqueous phase is recovered.

16. A separation process as claimed in claim 1 in which a trialkylphosphate is added as a third substance to the diluent.

17. A separation process as claimed in claim 16 in which the third substance is present in an amount within the range of 10–300 grams per liter.

* * * * *